United States Patent [19]

Lloyd

[11] Patent Number: 4,860,322

[45] Date of Patent: Aug. 22, 1989

[54] ANTI-CLOCK SKEW DISTRIBUTION APPARATUS

[75] Inventor: Stacey G. Lloyd, Aloha, Oreg.

[73] Assignee: Intel Corporation, Santa Clara, Calif.

[21] Appl. No.: 254,323

[22] Filed: Oct. 5, 1988

[51] Int. Cl.⁴ .............................................. H04L 7/00
[52] U.S. Cl. .................................... 375/107; 328/105; 371/1
[58] Field of Search ....................... 328/103, 105, 106; 307/480, 269, 590, 592, 595; 331/60, 74; 371/1; 375/106, 107, 118; 330/310, 150

[56] References Cited

U.S. PATENT DOCUMENTS 4,639,615  1/1987  Lee et al. ............................ 307/269
4,809,302  2/1989  Richman et al. .................... 375/107

Primary Examiner—Benedict V. Safourek

[57] ABSTRACT

Because of physical and electrical limitations, buffering of the clock in a data processing system often has to be provided by two different Integrated Circuit buffers. If the clock is connected in parallel to all buffer inputs (assuming that was within the clock drive capability) the outputs of one of the Integrated Circuits may be skewed or shifted in delay time relative to the outputs of the other integrated circuit, because of the differences in the buffers. Since, however, the delay times of all the buffers on each chip are nearly the same (to within a guaranteed tolerance typically) the circuit provided by this invention will give outputs all having small and predictable skews.

3 Claims, 2 Drawing Sheets

ANTI-CLOCK SKEW DISTRIBUTION APPARATUS

FIELD OF THE INVENTION

This invention relates to electronic digital systems and more particularly to synchronous digital systems.

BACKGROUND OF THE INVENTION

In a synchronous digital system, a master or system clock is distributed to all elements performing synchronous functions. In order to co-ordinate the switching and logical processes, it is essential that each element be connected to a clock signal line wherein the variation in clock pulse leading edge is, within a tight tolerance, simultaneous with the occurrence of the leading edge of the other clock pulses distributed to the other elements. The difference in time between the leading edge of one clock pulse on one clock line, and the leading edge of a corresponding clock pulse on another clock line, where both are derived from the same master or system clock, is called the clock skew and it is measured in fractions of a second.

Since it is impractical to have a single master clock drive every function in a synchronous digital system, a group of local clock lines are derived from the master clock input by multiple integrated circuit power and isolation amplifiers called buffers. It is the differences in the response time, called delay time, of these buffer integrated circuits that causes clock skew. Even when the delay time variance input to output between the buffers on a single integrated circuit chip is acceptably low, the guaranteed/specified range of delay times for all integrated circuit buffers typically is too wide to just straightforwardly connect in parallel the inputs of two integrated circuit buffers and expect to always yield outputs with acceptable clock skews. Statistics predict that with randomly selected circuits sometimes two IC chips within the range will be closely enough matched in propagation delay time will be selected, while other times the two IC chips selected randomly will not be closely enough matched in regard to delay times and an unacceptable clock skew between branches of the clock line will result.

The standard techniques of solving this problem are either to put in a delay circuit at the common (i.e., paralleled) input of each buffer chip and then adjust the delay circuit to compensate for the variation in buffer chips, or to select and grade by testing all buffer chips to be used into matched groups that have propagation delays close enough to each other to prevent an unacceptable clock skew from resulting. The former method requires the expense of extra components to form the delay circuits and requires adjustment of the delay circuits by technicians with the aid of expensive test equipment. The latter method requires technicians to operate automated test equipment testing and recording the propagation delay of each buffer into groups with very nearly the same propagation delay for future installation. Further, if either component fails, the adjustment or selection procedure, whichever the case may be, will have to be repeated to repair the circuit.

It is an object of this invention to provide an anti-clock skew distribution system without the cost and repair problems of matched or adjusted components. It is a further object of this invention to provide an anti-clock skew distribution system readily available "off the shelf" components.

SUMMARY OF THE INVENTION

Briefly stated in accordance with one aspect of the invention, the aforementioned objects are achieved by providing an anti-clock skew distribution system in a synchronous digital data system having a first multiple-buffer integrated circuit having a propagation delay of any buffer of $T_{PD1}$, with the maximum variation in propagation delay between any two buffers equal to K1. The system also has a second multiple-buffer integrated circuit having a propagation delay of any buffer of $T_{PD2}$, with a maximum variation in propagation delay between any two buffers equal to K2. A clock generator's single output is connected in parallel to a first buffer input of the first integrated circuit and a first buffer input of the second integrated circuit. A connection is made from the output of the first integrated circuit first buffer and the input of the second integrated circuit second buffer. Additionally, a connection is made from the output of the second integrated circuit first buffer to the input of the second buffer of the first integrated circuit. The clock pulse output of the second buffer of the first integrated circuit and the clock pulse output of the second integrated circuit will be skewed no more than /K1/+/K2/ in response to the same clock pulse input.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings:

DETAILED DESCRIPTION OF THE DRAWINGS

Figure 3:
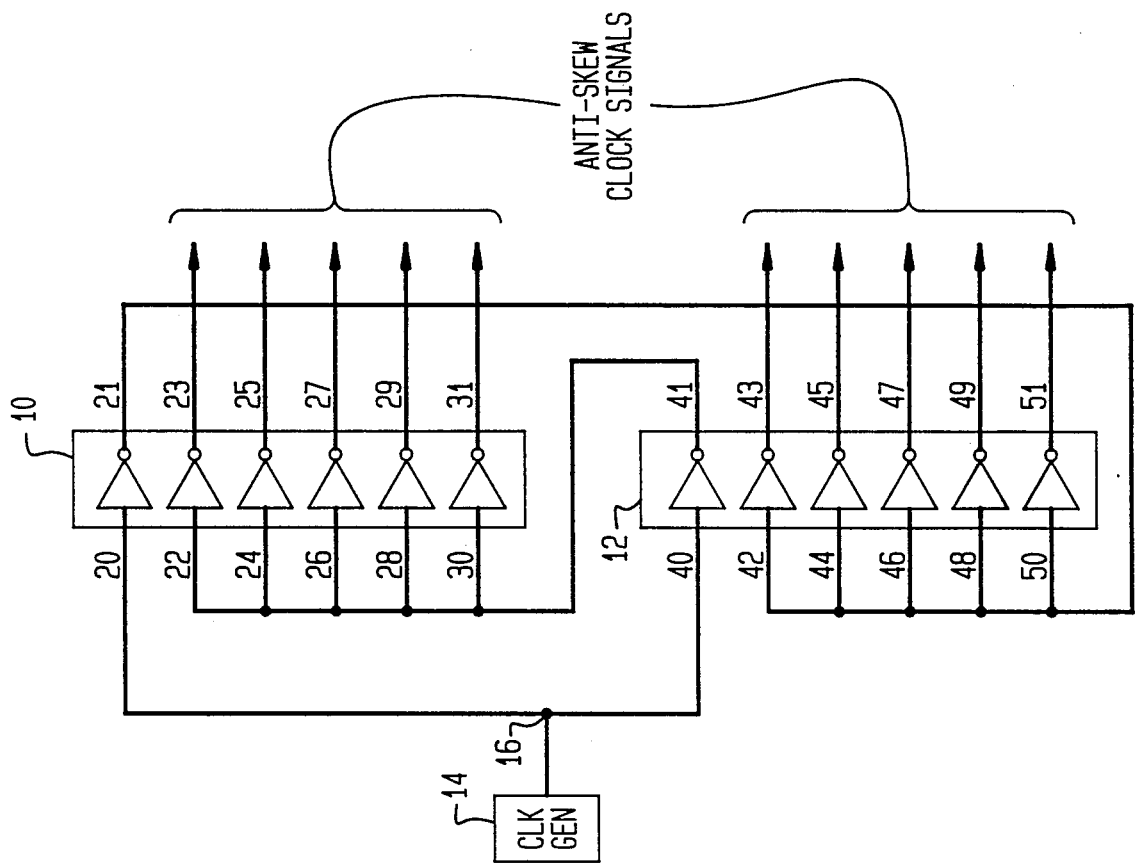
FIG. 3 shows diagrammatically a hex buffer, 10 clock output embodiment.
Figure 1:
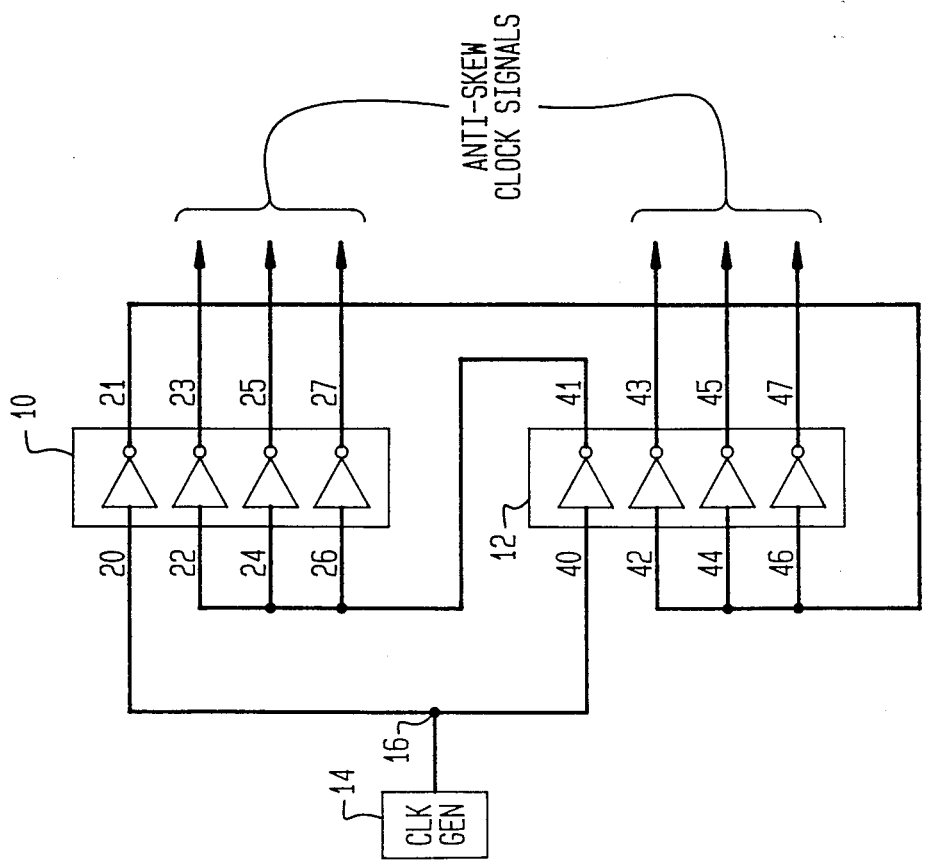
FIG. 1 shows diagrammatically a quad buffer, 6 clock output embodiment.

Those skilled in the art will immediately recognize that the only significant difference between the embodiment in FIG. 1 and the embodiment in FIG. 3 are the four further buffers in the latter, otherwise they are identical; therefore, this detailed description will only describe the quad buffer embodiment, as operation of the hex buffer embodiment will be immediately apparent therefrom by those skilled in the art.

Figure 2:
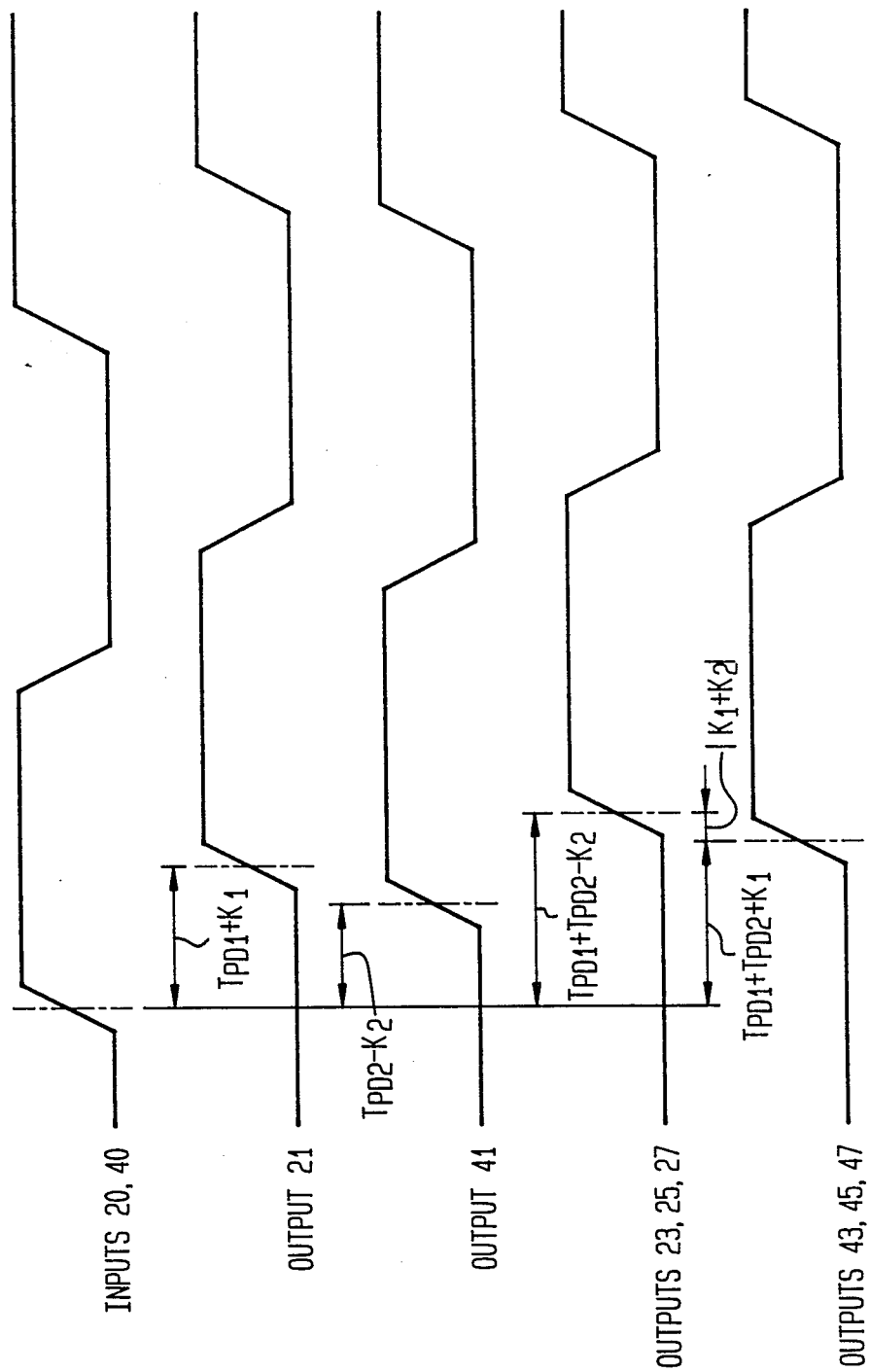
FIG. 2 is a timing diagram illustrating the effect of the propagation delays.

FIG. 1 shows two quad inverting buffer integrated circuits 10, 12 connected to a clock generator, 14. One input 20, of the first integrated circuit 10, is connected in parallel with one input 40 of the second integrated circuit, 12, to the clock generator output, 16. The resulting output 21 of input 20 and output 41 of input 40 are each inverted and delayed by their respective integrated circuits as shown in FIG. 2. In this embodiment, the output 21 is cross connected to inputs 42, 44, and 46 of IC12, and output 41 is cross connected to inputs 22, 24, 26 of IC10. The resulting outputs 23, 25 and 27 are inverted and delayed according to the characteristics of IC10, and similarly the resulting outputs 43, 45 and 47 are inverted and delayed according to the characteristics of IC12.

FIG. 2 presents the limiting or worst case combination of delay times and delay time variations of the multiple buffer integrated circuits. Integrated circuit 10 has a delay time of $T_{PD1}+K1$, that is a propagation delay that varies positively from the other buffers on the circuit 10 by the maximum variation K1, associated with buffer output 21. The remaining buffer outputs, 23, 25 and 27, are assumed to have the worst case variation of K1 from output 21 and thus have propagation delays equal to $T_{PD1}$. Similarly, integrated circuit 12 has a worst case propagation delay time of $T_{PD2}-K2$ associated with buffer output 41 which varies negatively from the buffers associated with the other buffer outputs by the maximum variation K2. The other buffers are assumed all to be at the maximum variation from the buffer whose output is 41, at $T_{PD2}$. Thus, when connected as in FIG. 1, outputs 23, 25 and 27 will vary from outputs 43, 45 and 47 by the maximum magnitude of delay or skew of $/K_1+K_2/$. As can be seen from FIG. 2, this value is independent of the characteristic propagation delays of each integrated circuit as long as the maximum or minimum limits are not attained, in which case a better than "worst case" would exist as it is not possible to go above or below these limits with the variations. Thus, IC10 and IC12 do not even have to be of the same type if the logic levels and clock rates are compatible. Thus, it shall be appreciated that there has been disclosed a new anti-clock skew circuit.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. In a synchronous digital data system, an anti-clock skew distribution system comprising:

a first multiple-buffer integrated circuit having a maximum propagation delay of $T_{PD1}$ and with a maximum variation in the propagation delay between any two buffers of said first multiple-buffer integrated circuit equal to K1 seconds;

a second multiple-buffer integrated circuit having a maximum propagation delay, $T_{PD2}$, and with a maximum variation in the propagation delay between any two buffers of said second multiple buffer integrated circuit equal to K2 seconds;

a clock generator having a single output connected in parallel to an input of a first buffer of said first integrated circuit and an input of a first buffer of said second integrated circuit;

a first signal connection connecting an output of said first integrated circuit first buffer to at least one other input of at least a second buffer of said second integrated circuit; and a second signal connection connecting an output of said second integrated circuit first buffer to at least one other input of at least a second buffer of said first integrated circuit;

whereby in response to identical clock pulse inputs to each of said first buffer inputs, a clock pulse output of said second buffer of said first integrated circuit will be skewed equal to or less than $/K1/+/K2/$ seconds of a clock pulse output of said second buffer of said second integrated circuit.

2. An anti-clock skew distribution system as set forth in claim 1, whereby the first and second multiple buffer integrated circuits are both quad buffers having four independent inputs and four independent outputs, and said first signal connecting means is connected to at least two otherwise unconnected buffer inputs of said second integrated circuit and said second signal connecting means is connected to at least two otherwise unconnected buffer inputs of said first integrated circuit, forming at least four twice buffered outputs that have a maximum clock skew between any two of the at least four signals of $/K1/+/K2/$ seconds.

3. An anti-clock skew distribution system as set forth in claim 1, whereby the first and second multiple buffer integrated circuits are both hex buffers having six independent inputs and six independent outputs, and said first signal connecting means is connected to at least two otherwise unconnected buffer inputs of said second integrated circuit and said second signal connecting means is connected to at least two otherwise unconnected buffer inputs of said first integrated circuit, forming at least four twice buffered outputs that have a maximum clock skew between any two of the at least four signals of $/K1/+/K2/$ seconds.

* * * * *

UNITED STATES PATENT AND TRADEMARK OFFICE
CERTIFICATE OF CORRECTION

PATENT NO. : 4,860,322

DATED : January 12, 1990

INVENTOR(S) : Lloyd

It is certified that error appears in the above-identified patent and that said Letters Patent is hereby corrected as shown below:

Cover Page

Section [73] delete "Intel Corporation, Santa Clara, Calif." and insert in its place --Siemens Aktiengesellschaft, Berlin and Munich, Fed. Rep. of Germany--

Signed and Sealed this

Sixteenth Day of October, 1990

*Attest:*

HARRY F. MANBECK, JR.

*Attesting Officer*  *Commissioner of Patents and Trademarks*